United States Patent
Ye

(10) Patent No.: US 8,625,511 B2
(45) Date of Patent: Jan. 7, 2014

(54) METHOD AND COMMUNICATION TERMINAL FOR IMPLEMENTING A VOICE SERVICE THROUGH A WIRELESS NETWORK

(75) Inventor: Xiaoling Ye, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 391 days.

(21) Appl. No.: 13/091,689

(22) Filed: Apr. 21, 2011

(65) Prior Publication Data

US 2011/0199974 A1 Aug. 18, 2011

Related U.S. Application Data

(63) Continuation of application No. PCT/CN2009/074501, filed on Oct. 21, 2009.

(30) Foreign Application Priority Data

Oct. 21, 2008 (CN) .......................... 2008 1 0224607

(51) Int. Cl.
*H04W 4/00* (2009.01)
*H04L 12/66* (2006.01)
*H04W 72/00* (2009.01)

(52) U.S. Cl.
USPC ............................ 370/329; 370/341; 370/352

(58) Field of Classification Search
None
See application file for complete search history.

(56) References Cited

U.S. PATENT DOCUMENTS

| | | | |
|---|---|---|---|
| 8,204,029 B2 * | 6/2012 | Stephenson et al. | 370/338 |
| 8,289,941 B2 * | 10/2012 | Kezys | 370/338 |
| 2006/0077968 A1 | 4/2006 | Pitsoulakis et al. | |
| 2006/0126594 A1 | 6/2006 | Tu | |
| 2007/0253405 A1 | 11/2007 | Willis et al. | |
| 2007/0280200 A1 | 12/2007 | Patel | |
| 2008/0102843 A1 * | 5/2008 | Todd et al. | 455/445 |
| 2008/0261593 A1 * | 10/2008 | Wong et al. | 455/435.1 |
| 2012/0270541 A1 * | 10/2012 | Rydnell et al. | 455/426.1 |
| 2013/0003703 A1 * | 1/2013 | Todd et al. | 370/331 |

FOREIGN PATENT DOCUMENTS

| | | |
|---|---|---|
| CN | 101034997 A | 9/2007 |
| WO | WO 2007033485 A2 | 3/2007 |

OTHER PUBLICATIONS

Office Action issued in corresponding Chinese Patent Application No. 200810224607.2, mailed Sep. 26, 2011.
Office Action issued in corresponding Chinese Patent Application No. 200810224607.2, mailed Nov. 28, 2012.

(Continued)

*Primary Examiner* — Chi Pham
*Assistant Examiner* — Soon-Dong D Hyun
(74) *Attorney, Agent, or Firm* — Brinks Gilson & Lione

(57) ABSTRACT

The present invention discloses a method and a communication terminal for implementing a voice service through a wireless network. The method includes: generating a request for a voice service according to a voice service access code and generating a trigger signal according to the request; setting up a connection with the wireless network according to the trigger signal; performing network registration for the voice service; and processing a call of the voice service through the network connection after the network registration is successful. The technical solution of the present invention overcomes the conflict between Voice over Internet Protocol (VoIP) and dial-on-demand when VoIP traffic is carried over a Packet Switched (PS) network, so that no radio bandwidth is wasted and that the user can use VoIP at any time with no need to modify the network.

10 Claims, 7 Drawing Sheets

(56) References Cited

OTHER PUBLICATIONS

Written Opinion of the International Searching Authority issued in corresponding PCT Patent Application No. PCT/CN2009/074501, mailed Feb. 4, 2010.

International Search Report issued in corresponding PCT Patent Application No. PCT/CN2009/074501, mailed Feb. 4, 2010.
Extended European Search Report issued in corresponding European Patent Application No. 09821582.5, mailed May 23, 2012.
Office Action issued in corresponding Chinese Patent Application No. 200810224607.2, mailed Apr. 16, 2012.

* cited by examiner

METHOD AND COMMUNICATION TERMINAL FOR IMPLEMENTING A VOICE SERVICE THROUGH A WIRELESS NETWORK

CROSS-REFERENCE TO RELATED APPLICATIONS

This application is a continuation of International Application No. PCT/CN2009/074501, filed on Oct. 21, 2009, which claims priority to Chinese Patent Application No. 200810224607.2, filed on Oct. 21, 2008, both of which are hereby incorporated by reference in their entireties.

FIELD OF THE INVENTION

The present invention relates to mobile communications, and in particular, to a method and a communication terminal for implementing voice services through a wireless network.

BACKGROUND OF THE INVENTION

The Customer Premises Equipment (CPE), such as an Integrated Access Device (IAD) and an Analog Telephony Adapter (ATA), is relative to network-side equipment. It provides an interface for a communication terminal to communicate with a core network. In a home network, the IAD used at present accesses the core network by different means, such as Digital Subscriber Line (DSL), Asynchronous Transfer Mode (ATM), and Ethernet (ETH). The CPE faces the access network and provides the communication terminal with the functions such as the data service function and the Voice over Internet Protocol (VoIP) service function.

With the convergence of core networks, a terminal must support access to the core network through different edge networks. The IAD therefore also supports data and VoIP services in a radio way. A fixed access network has sufficient bandwidth and is capable of providing smooth paths for connected communication terminals. For a wireless network, however, bandwidth resources are precious. Even when a communication terminal is online, if the network detects that the terminal does not produce real Internet traffic, the network will disconnect the terminal actively. Therefore, the communication terminal must support the dial-on-demand function. In the prior art, dial-on-demand in a wireless network is mature for data applications. For VoIP services, however, no mature solution is available. The terminal that provides the VoIP service must send periodical registration update messages to a server to maintain the connection with the server in the radio access network, or else the server will determine that the VoIP device is unavailable. When originating a VoIP call, the communication terminal sets up a Packet Switched (PS) connection temporarily and initiates a re-registration process.

During the implementation of the present invention, the inventor finds at least the following problems in the prior art: (1) Because the setup of a radio bearer connection takes time, the call of the communication terminal may fail. (2) To guarantee success of the VoIP service, it is necessary to set up a connection with a wireless bearer via a data service, that is a network data domain, and then originate the call. This is too inconvenient for the communication terminal. Moreover, in the case of emergency calls, a user has no time to set up a wireless network connection, and therefore emergency calls are affected. (3) After the connection is disconnected due to dial-on-demand, the communication terminal fails to receive new calls. Because of such problems, in the operation of some wireless networks, dial-on-demand is always disabled when the VoIP service is enabled.

SUMMARY OF THE INVENTION

Embodiments of the present invention provide a method and a communication terminal for implementing a voice service through a wireless network, so as to resolve the problem of the voice service inability caused by the dial-on-demand function on the communication terminal.

A method for implementing a voice service through a wireless network includes:

generating a request for a voice service according to an operation on a communication terminal and generating a trigger signal according to the request;

setting up a connection with a wireless network according to the trigger signal;

performing network registration for the voice service; and processing a call of the voice service through the network connection after the network registration is successful.

A communication terminal for implementing a voice service through a wireless network includes:

a Plain Old Telephone Service (POTS) unit, configured to generate a request for a voice service according to an operation on the communication terminal;

a triggering logic unit, configured to generate a trigger signal according to the request;

a dial-on-demand unit, configured to set up a connection with the wireless network according to the trigger signal; and a voice service unit, configured to request network registration and process a call of a voice service through the network connection after the network registration is successful.

The embodiments of the present invention provide the following benefit: the technical solution provided in the embodiments of the present invention overcomes the conflict between a VoIP service and dial-on-demand when VoIP traffic is carried over a PS network, so that no radio bandwidth is wasted and that the user can use the VoIP service at any time with no need to modify the network.

DETAILED DESCRIPTION OF THE EMBODIMENTS

To better explain the purpose, technical features, and benefits of the present invention, the technical solution of the present invention is described in detail with reference to the accompanying drawings and exemplary embodiments. The embodiments of the present invention provide a solution to resolve the conflict between the VoIP service and dial-on-demand functions of the CPE (IAD) and to compromise between the bandwidth requirement of the radio access network and the need of communication terminals to use VoIP.

A POTS phone triggering method is adopted. When the communication terminal requests a VoIP service, a POTS phone triggers the IAD to set up a connection to the PS network before a VoIP call is originated. The POTS unit is the communication interface for the POTS phone to implement the VoIP service through the PS network. The POTS phone is the fixed phone in daily use. The VoIP service is a bearer mode of voice services. Because the packets of VoIP are transferred over the PS network, the VoIP service is a voice service based on IP transport.

Figure 1:
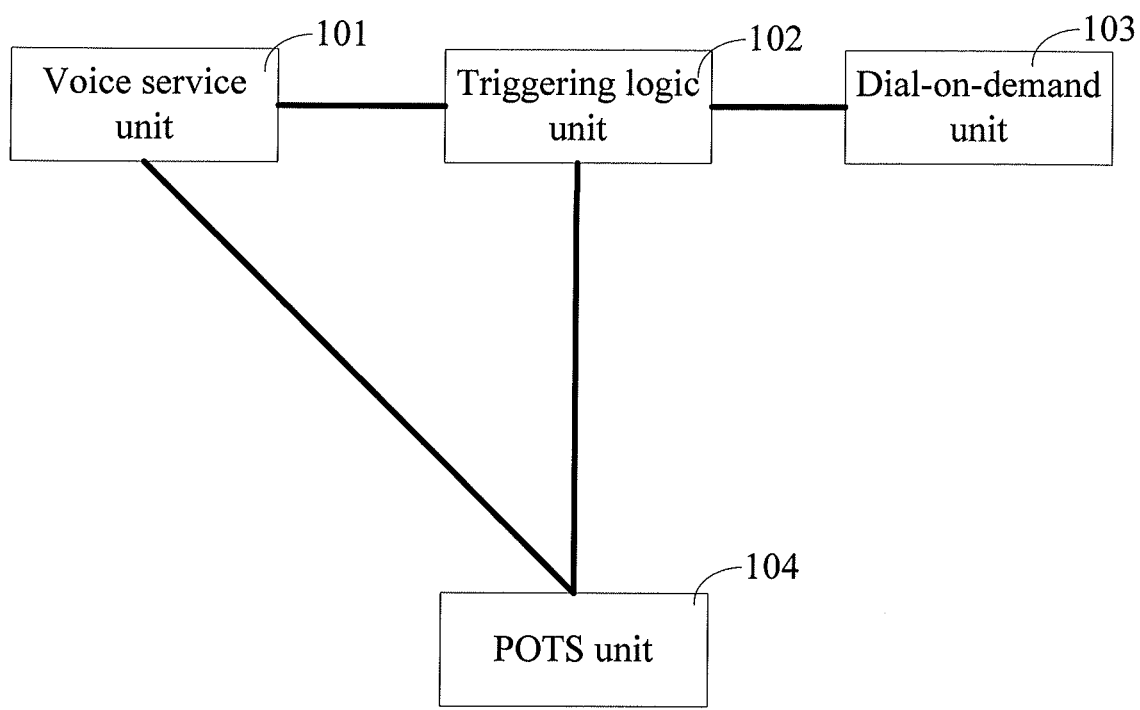
FIG. 1 illustrates an internal structure of a communication terminal in an embodiment of the present invention.
Figure 2:
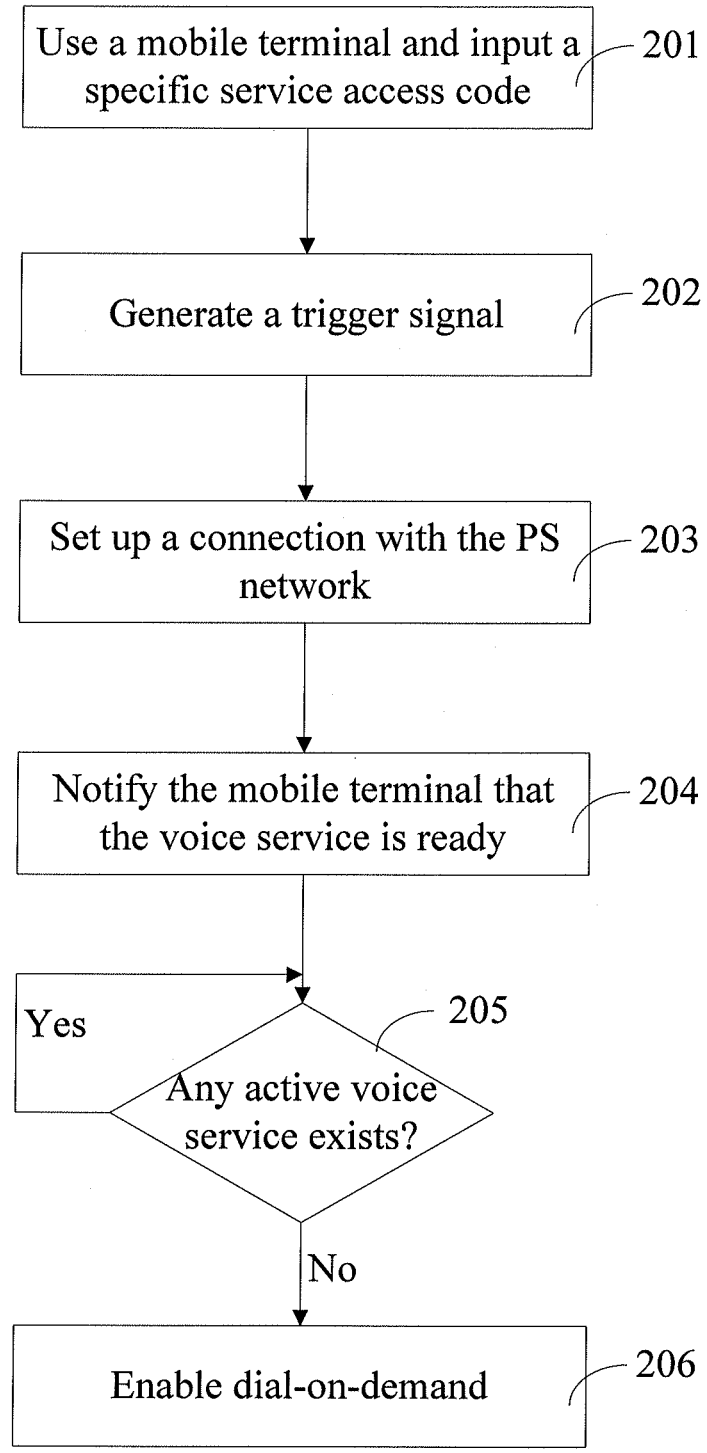
FIG. 2 illustrates a procedure of a method in an embodiment of the present invention.

As shown in FIG. 1, based on the existing IAD service module, the IAD further includes a triggering logic unit 102, configured to judge whether the trigger condition of a dialing-one-demand unit 103 is met and provide the dial-on-demand unit 103 with a decision on whether to disconnect a network connection, and further configured to trigger the dial-on-demand unit 103 to start the wireless network connection. In the IAD service module to which the triggering logic unit 102 is added, a voice service unit 101 is connected to and communicates with a POTS unit 104; the voice service unit 101 is also connected to and sends a request to the triggering logic unit 102; the triggering logic unit 102 communicates with the voice service unit 101 and the POTS unit 104 each to receive a request and a signal, and also communicates with the dial-on-demand unit 103 to send an instruction. Specifically:

The voice service unit 101 is configured to request network registration; and configured to process a specific voice service. That is, the voice service unit is configured to process the information data generated due to events that are forwarded by the POTS unit 104 and are from users/POTS phones and to control the entire call process, in which the entire call process includes origination, connection, and teardown of the call.

This includes encapsulating or decapsulating digital voice data, determining the IP address of the associated gateway according to information in an area code database, adding the IP address to IP packets, and selecting an optimal route. The voice service unit 101 compresses voice data codes with a compression algorithm, packetizes the data according to the Transmission Control Protocol/Internet Protocol (TCP/IP) standard and delivers data packets to their destination through the core network. Or, after receiving data packets, the voice service unit 101 strings the data packets together and decompresses them to restore an original voice signal. Further, the voice service unit 101 maps an area code to the IP address of a gateway in the area and stores the IP address in a database. When the communication terminal originates a call, the gateway determines the IP address of the associated gateway according to the information in the area code database, adds the IP address to IP packets, and selects an optimal route to reduce the transmission delay. The IP packets are delivered to the destination gateway through the Internet. In areas where the Internet is not available or a gateway is not configured, a router can be installed and the nearest gateway switches a call through the toll telephone network to implement communication services.

The triggering logic unit 102 is configured to generate a trigger signal according to a request or a signal from the voice service unit 101 or/and the POTS unit 104 and send the trigger signal to the dial-on-demand unit 103.

The dial-on-demand unit 103 is configured to dial according to the detected trigger signal from the triggering logic unit 102.

The POTS unit 104 is a necessary interface between the network and the POTS phones. It is configured to send events triggered by the user/POTS phone, for example, signals generated by off-hook, dialing, hookflash, on-hook, and sounds, to the voice service unit 101, and send events of the voice service unit 101, for example, tone playing and sound signals, to the user/POTS phone.

The POTS unit 104 may include:
a terminal call transferring unit 107, configured to send a call transfer operation code after the network connection is set up, where the call transfer operation code is used to request the transfer of a call of the voice service to a Public Switched Telephone Network (PSTN) number or telecommunications network number (a number in the CS domain, in which CS is short for Circuit Switched) of the communication terminal.

The POTS unit 104 may further include:
a terminal call transfer canceling unit 108, configured to send a call transfer cancellation operation code to the server after the call of the voice service is transferred.

With the communication terminal (that is, CPE) provided according to the above embodiment of the present invention, when the terminal implements the VoIP service through the PS network, the conflict with dial-on-demand is overcome, so that no radio bandwidth is wasted and that the VoIP service can be used at any time.

Figure 3:
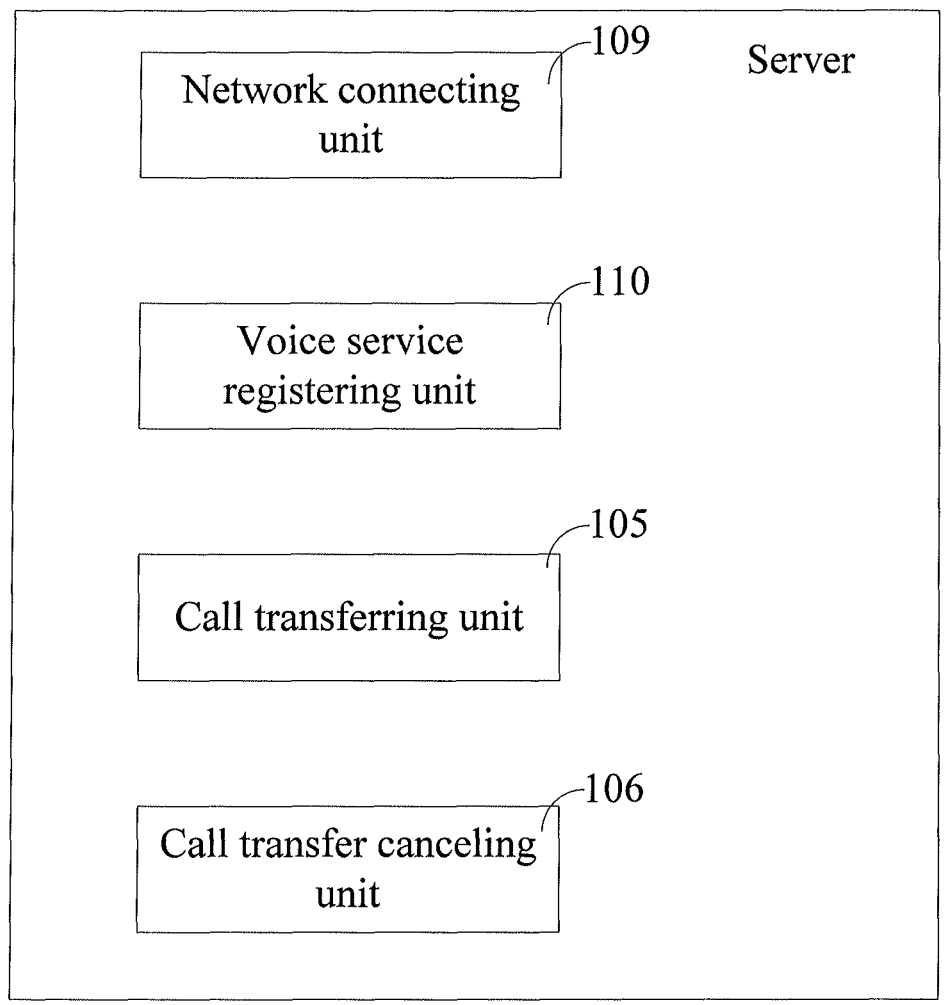
FIG. 3 illustrates a structure of a server in an embodiment of the present invention.

Corresponding to the communication terminal, a server according to an embodiment of the present invention is illustrated in FIG. 3. The server is located in a public network and includes:

a network connecting unit 109, configured to set up a wireless network connection with the communication terminal; and particularly, set up a network connection at the bearer layer;

a voice service registering unit 110, configured to receive a request for network registration from the communication terminal, complete the network registration, and receive a voice service call; and a call transferring unit 105, configured to transfer an incoming voice service call to a PSTN number, or a CS number, or other numbers of the current communication terminal after the bearer layer network connection is set up between the communication terminal and the wireless network. Specifically, a user inputs the call transfer operation code through the POTS unit 104, and the call transferring unit 105 identifies the call transfer operation code from the POTS unit 104 and sends the operation code, if it is determined that the call transfer operation code is correct, to the voice service unit 101. The voice service unit 101 sends a call transfer request to the network-side server. The network-side server processes the request and the call transfer is complete. Call transfer includes the following types:

1. If the communication terminal supports PSTN lines, the call is transferred to a PSTN number supported by the IAD.

2. The call is transferred to a CS number of the IAD, that is, a telecommunications network number.

3. The call is transferred to other numbers. For example, when "**51*22334455#" is inputted to the terminal call transferring unit 107 of the POTS unit 104 to set call transfer, the home gateway terminal routes the call of the POTS phone under the gateway to the network-side server and the network-side server processes the call transfer. Afterwards, the network-side server transfers a call to the home gateway from the outside to the number 22334455, instead of routing the call to the home gateway terminal.

The network-side server further includes:

a call transfer canceling unit 106, configured to cancel the call transfer service of the communication terminal if receiving a call transfer cancellation operation code from the communication terminal after the network registration is successful and the incoming call is transferred. Specifically, the user inputs the call transfer cancellation operation code to the terminal call transfer canceling unit 108 of the POTS unit 104; the communication terminal sends the operation code to the network-side server; the network-side server identifies the call transfer cancellation operation code from the POTS unit 104 and processes the cancellation of the call transfer service if it is determined that the operation code is correct.

The network-side server cooperates with the communication terminal and sets up a wireless network connection with the communication terminal to implement the VoIP service. After receiving a call transfer operation code, the network-side server transfers a call destined for the communication terminal to other networks, and after receiving a call transfer cancellation operation code from the communication terminal, the network-side server cancels the call transfer service of the communication terminal.

Figure 4:
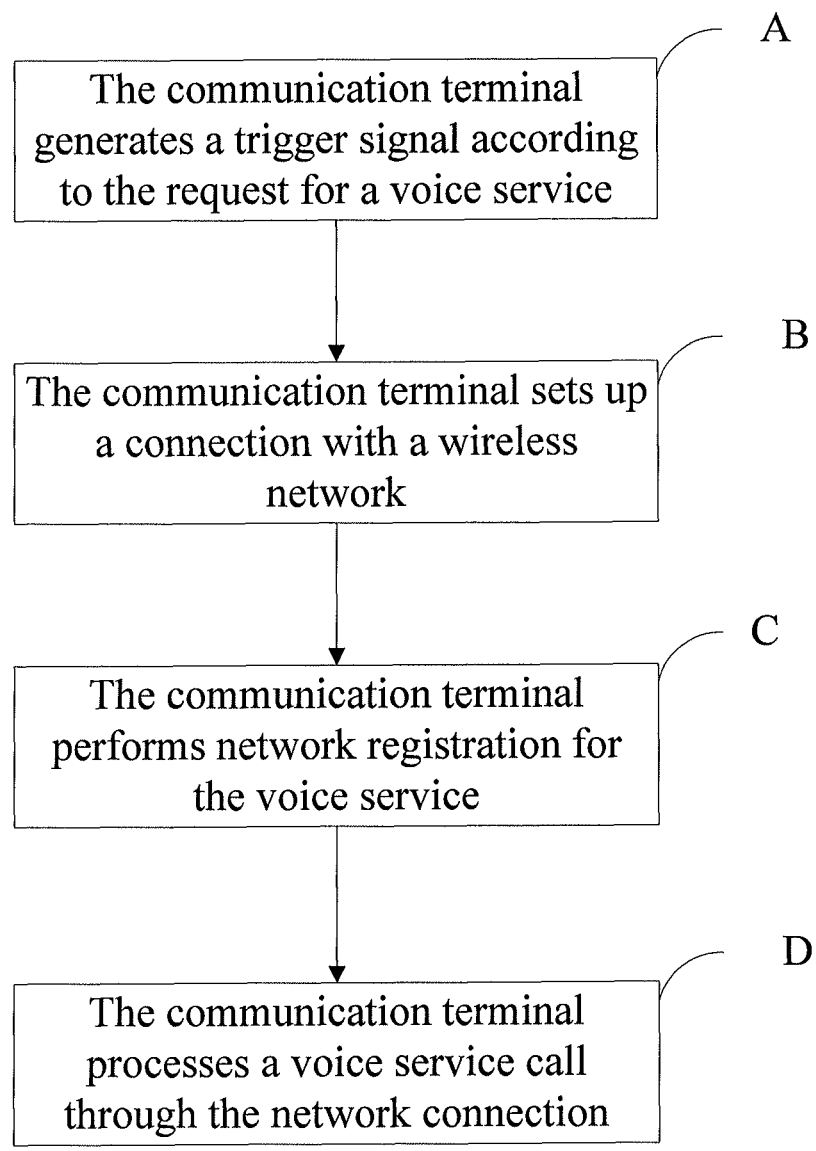
FIG. 4 illustrates a procedure of a method on a communication terminal side in an embodiment of the present invention.

To further disclose the technical solution of the present invention, a complete service procedure is described. When a user requires a VoIP service, the user performs an appropriate operation on the communication terminal. The operation generates a service access code and the service access code generates a request. As shown in FIG. 4, the procedure includes:

Step A: The communication terminal generates a trigger signal according to the request for a voice service.

Step B: The communication terminal sets up a network connection with the wireless network according to the trigger signal.

Step C: The communication terminal performs network registration for the voice service.

Step D: The communication terminal originates a call of the voice service through the network connection after the network registration is successful.

Through the above steps, the communication terminal is connected to the network. Through the network connection, the user can use the VoIP service normally. Furthermore, because the request is generated by using the following method provided by the embodiment of the present invention, the conflict between the VoIP service and dial-on-demand is overcome, so that no radio bandwidth is wasted and that the user can use VoIP at any time with no need to modify the network. Specifically:

When there is no data service on the IAD and dial-on-demand is enabled, the IAD is disconnected from the PS network.

Step 201: The user inputs a specific service access code, for example, *67*, through the communication terminal. The voice service unit 101 of the communication terminal is triggered to send the service access code.

Step 202: The triggering logic unit 102 receives the service access code, determines that the communication terminal requires the VoIP service according to the service access code, and generates and sends a trigger signal immediately.

Step 203: The dial-on-demand unit 103 receives the trigger signal and sets up a connection with the PS network.

After the connection with the PS network is successfully set up, the dial-on-demand unit 103 notifies the voice service unit to perform network registration.

Step 204: If the communication terminal is not hooked on, after the network registration is successful, the communication terminal is notified that the VoIP service is ready and a dial tone is played to the communication terminal.

Steps 201 to 204 describe the process of setting up a connection with the PS network according to the need of dial-on-demand.

Step 205: After the network connection is set up, the dial-on-demand unit 103 queries the triggering logic unit 102 about whether an active voice service exists. If an active service exists, the dial-on-demand unit 103 queries again at a predetermined interval; if no active service exists, the procedure goes to step 206.

The query step is included because it is possible that the communication terminal is in a conversation but the user has left.

Step 206: When there is no voice call, the communication terminal decides to end the use of the VoIP service; and if there is no data service within a period of time, the dial-on-demand function is enabled.

The above steps describe the process of triggering dial-on-demand and the process of enabling dial-on-demand automatically in detail. The conflict between the VoIP service and dial-on-demand is overcome, so that no radio bandwidth is wasted and that the user can use the VoIP service at any time with no need to modify the wireless network.

Figure 5:
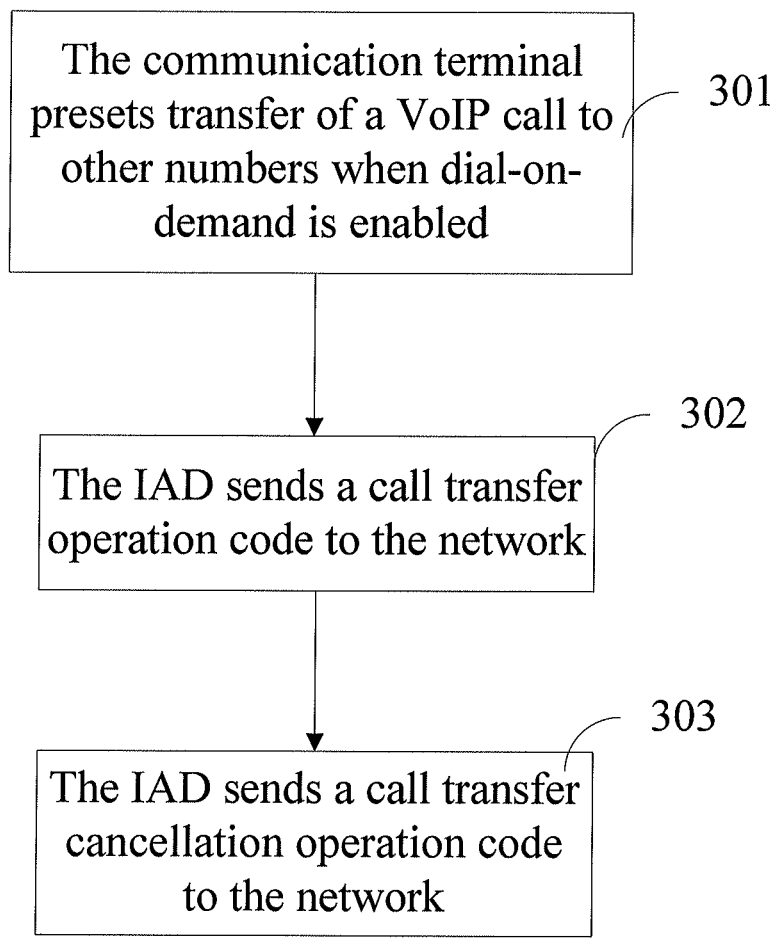
FIG. 5 illustrates a procedure of call transfer after dial-on-demand is enabled in an embodiment of the present invention.

In practice, if the communication terminal enables dial-on-demand, the service logic for receiving a call must be improved, as shown in FIG. 5.

After dial-on-demand is enabled, because the communication terminal is disconnected from the PS network, VoIP signaling cannot be sent to the IAD. The IAD may support the following steps:

Step 301: The communication terminal presets the transfer of a VoIP call to other numbers when dial-on-demand is enabled through the network service located in the communication terminal. The communication terminal has the following options for call transfer:

1. If the communication terminal supports PSTN lines, the call is transferred to a PSTN number supported by the IAD.

2. The call is transferred to a CS number of the IAD, that is, a telecommunications network number.

3. The call is transferred to other numbers.

The call transfer service requires support of the network-side server and the communication terminal must have activated the service.

Step 302: With dial-on-demand enabled, before the IAD is disconnected from the network, the IAD transfers a VoIP call according to the above setting and sends a call transfer operation code to the network.

Step 303: When VoIP service registration is successful, the IAD can cancel the call transfer service according to the configured option and send a call transfer cancellation operation code to the network.

Steps 201 to 206 correspond to steps 301 to 303. In the IAD service module provided in the embodiment of the present invention, the POTS unit 104 receives the specific service access code, for example, *67*, and sends the service access code to the triggering logic unit 102; the triggering logic unit 102 receives the service access code, determines that the communication terminal requires the VoIP service according to the service access code, and sends a trigger signal to the dial-on-demand unit 103 immediately; the dial-on-demand unit 103 receives the trigger signal and sets up a connection with the PS network; after the PS network is connected successfully, the dial-on-demand unit 103 notifies the voice service unit 101 to perform network registration.

After the network connection is set up, if it is necessary to enable dial-on-demand, the dial-on-demand unit 103 queries the triggering logic unit 102 about whether an active voice service exists and if there is no active voice service, enables the dial-on-demand function.

With the technical solution in steps 301 to 303, the call transfer service function of the communication terminal is implemented.

When the communication terminal sets up a connection with the PS network according to the need of dial-on-demand, the implementation is not limited to that described in steps 201 to 204. Other embodiments of the present invention provide the following procedures.

Figure 6:
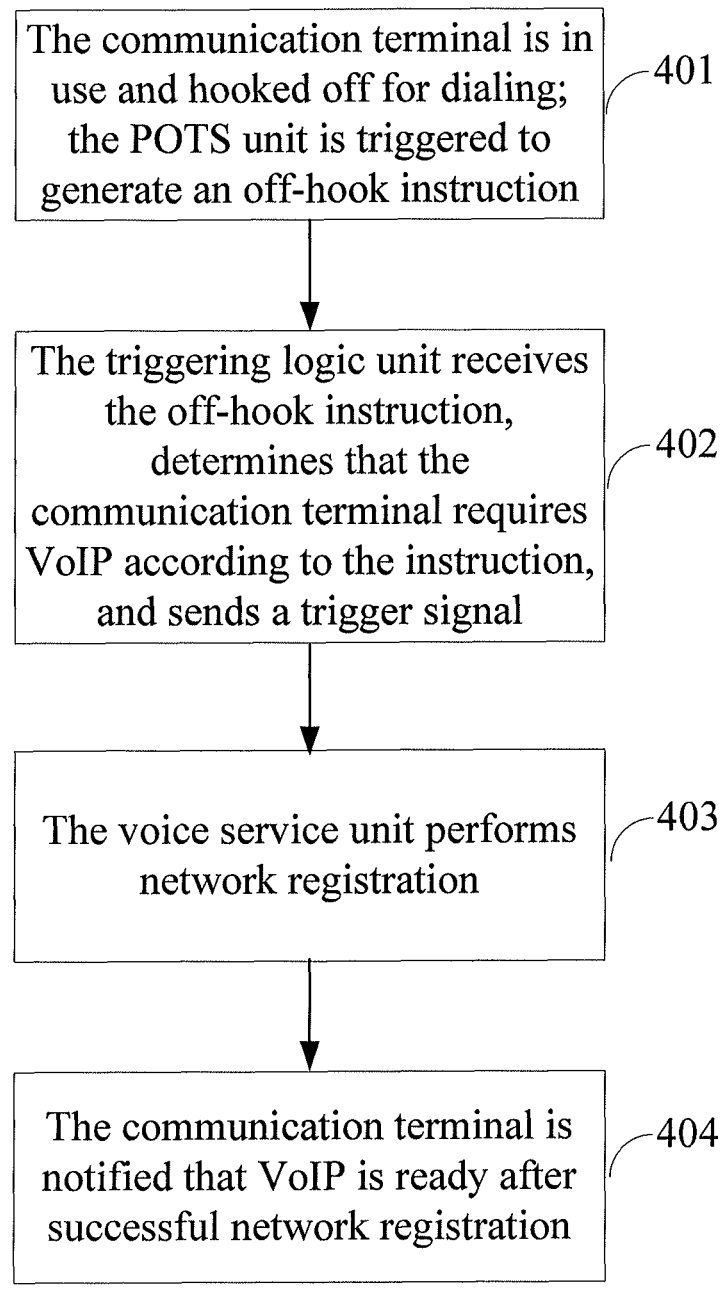
FIG. 6 illustrates a first implementation of VoIP on the communication terminal side in an embodiment of the present invention.

When there is no data service on the IAD and dial-on-demand is enabled, the IAD is disconnected from the PS network. As shown in FIG. 6, a procedure for setting up a connection with the PS network includes:

Step 401: The communication terminal is in use and hooked off for dialing. The POTS unit 104 is triggered to generate and send an off-hook instruction.

Step 402: The triggering logic unit 102 receives the off-hook instruction, determines that the communication terminal requires VoIP according to the instruction, and sends a trigger signal immediately.

Step 403: The dial-on-demand unit 103 receives the trigger signal and sets up a connection with the PS network.

After the connection with the PS network is successfully set up, the dial-on-demand unit 103 notifies the voice service unit 101 to perform network registration.

Step 404: If the communication terminal is not hooked on, after the network registration is successful, the communication terminal is notified that the VoIP service is ready and a dial tone is played to the communication terminal.

Steps 401 to 404 describe a process where the communication terminal sets up a connection with the PS network according to an off-hook action, therefore providing an alternative solution for VoIP implementation. The solution overcomes the conflict between VoIP and dial-on-demand, so that no radio bandwidth is wasted and that the user can use VoIP at any time.

Figure 7:
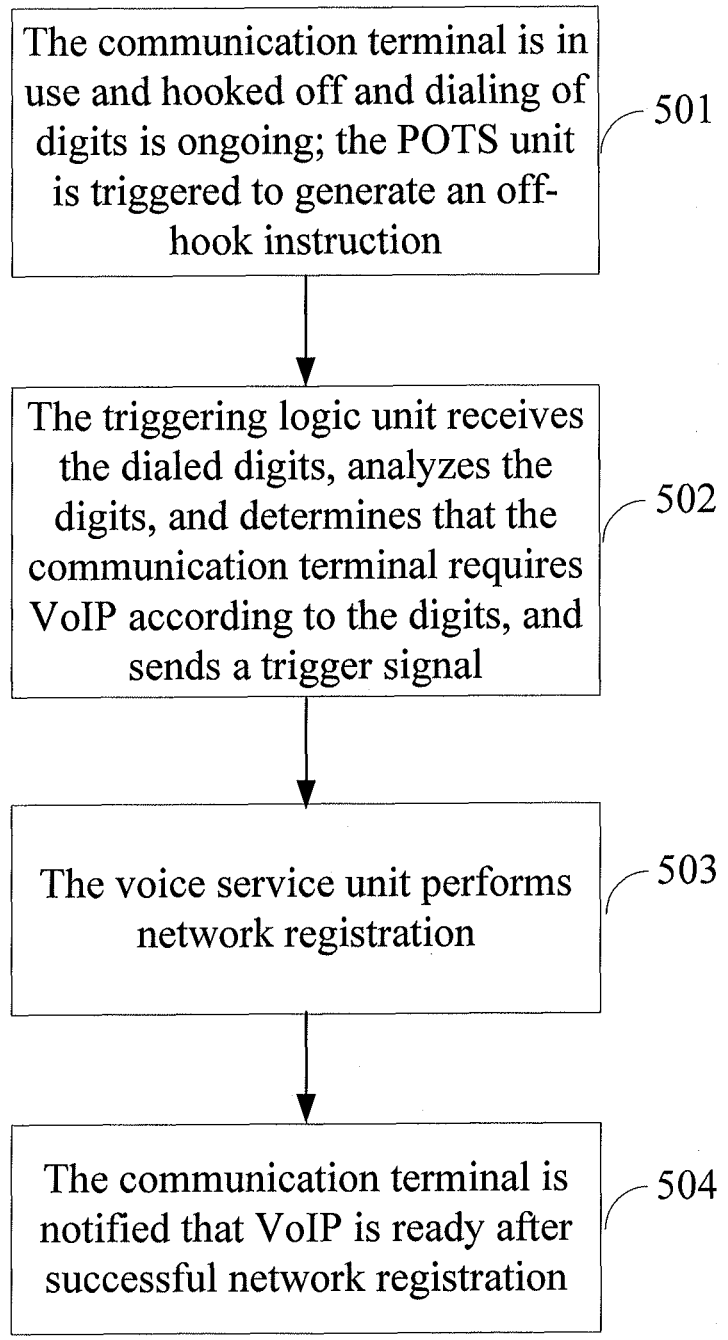
FIG. 7 illustrates a second implementation of VoIP on the communication terminal side in an embodiment of the present invention.

When there is no data service on the IAD and dial-on-demand is enabled, the IAD is disconnected from the PS network. As shown in FIG. 7, a procedure for setting up a connection with the PS network includes:

Step 501: The communication terminal is in use and hooked off and dialing of digits is ongoing. The POTS unit 104 is triggered to generate and send an off-hook instruction.

Step 502: The triggering logic unit 102 receives the dialed digits, analyzes the digits, and determines that the communication terminal requires VoIP according to the digits, and sends a trigger signal immediately.

Step 503: The dial-on-demand unit 103 receives the trigger signal and sets up a connection with the PS network.

After the connection with the PS network is successfully set up, the dial-on-demand unit 103 notifies the voice service unit 101 to perform network registration.

Step 504: If the communication terminal is not hooked on, after the network registration is successful, a Session Initiation Protocol (SIP) call is originated to the network.

If the network access and registration process exceeds a specific length of time, a voice announcement or a music prompt may be played to the communication terminal, for example, "Connecting to the network. Please wait", "Registering with the server. Please wait.", or "The call is being connected. Please wait". Or, the communication terminal is notified that the VoIP service is ready and a dial tone is played to the communication terminal.

Steps 501 to 504 describe a process where the communication terminal sets up a connection with the PS network according to an off-hook and dialing action, therefore providing an alternative solution for VoIP implementation. The solution overcomes the conflict between the VoIP service and dial-on-demand, so that no radio bandwidth is wasted and that the user can use the VoIP service at any time.

With the technical solution provided in the embodiments of present invention, when the communication terminal is disconnected from the PS network, the IAD can be connected with the PS network through POTS phone triggering, Foreign Exchange Station (FXS) off-hook triggering, or dialing triggering. Furthermore, after dial-on-demand is enabled, before the communication terminal is disconnected from the PS network, call transfer is set to ensure that an incoming VoIP call is received. In addition, after successful VoIP service registration, if a VoIP call is transferred and call transfer needs to be cancelled, the IAD sends a call transfer cancellation operation code to the network. The technical solution overcomes the conflict between VoIP and dial-on-demand when the VoIP service is carried over a PS network, so that no radio bandwidth is wasted and that the user can use VoIP at any time.

Those skilled in the art understand that the foregoing embodiments of the present invention can be implemented by hardware or by software on a necessary universal hardware platform. The technical solution of the present invention may be embodied in a software product which can be stored in a nonvolatile storage medium. The storage medium may be a Compact Disk Read-Only Memory (CD-ROM), a USB flash disk, or a removable hard drive. The software product includes a number of instructions that enable a computer device (such as a personal computer, a server, or a network device), to execute the method provided in the embodiments of the present invention.

Although the present invention has been described through exemplary embodiments, the invention is not limited to such embodiments. It is apparent that those skilled in the art can make various modifications and variations to the invention without departing from the spirit and scope of the present invention. The invention is intended to cover the modifications and variations provided that they fall within the scope of protection defined by the claims or their equivalents.

What is claimed is:

1. A method for a communication terminal implementing a voice service through a wireless network, wherein the communication terminal has a dial-on-demand function; the method comprising:

determining that dial-on-demand is enabled and the communication terminal is disconnected with the wireless network;

acquiring an operation on the communication terminal;

generating a request for a voice service according to the operation on the communication terminal and generating a trigger signal according to the request;

setting up a network connection with the wireless network according to the trigger signal;

performing network registration for the voice service; and processing a call of the voice service through the network connection after the network registration is successful.

2. The method of claim 1, wherein the generating the request for a voice service according to the operation on the communication terminal comprises:

generating the request according to a service access code.

3. The method of claim 1, wherein the generating the request for a voice service according to the operation on the communication terminal comprises:

generating the request according to a signal of the operation on the communication terminal.

4. The method of claim 1, wherein the generating the request for a voice service according to the operation on the communication terminal comprises:
   generating the request according to digits dialed from the communication terminal.

5. The method of claim 1, wherein after the setting up the network connection with the wireless network, the method further comprises:
   requesting a transfer of an incoming call of a voice service to a Public Switched Telephone Network (PSTN) number of the communication terminal or a telecommunications network number of the communication terminal.

6. The method of claim 5, after the transfer of the incoming call of the voice service to the PSTN number the communication terminal or the telecommunications network number of the communication terminal, the method further comprising:
   requesting a server to cancel the transfer of the incoming call of the voice service transfer.

7. The method of claim 1, wherein after the processing a call of the voice service through the network connection, the method further comprises:
   when it is determined that there is no data service within a period of time, enabling the dial-on-demand function.

8. A communication terminal for implementing a voice service through a wireless network, wherein the communication terminal has a dial-on-demand function;
   the communication terminal comprising:
   a determining unit, configured to determine that the dial-on-demand is enabled and the communication terminal is disconnected with the wireless network;
   an acquiring unit, configured to acquire an operation on the communication terminal;
   a Plain Old Telephone Service (POTS) unit, configured to generate a request for a voice service according to the operation on the communication terminal;
   a triggering logic unit, configured to generate a trigger signal according to the request;
   a dial-on-demand unit, configured to set up a network connection with the wireless network according to the trigger signal; and
   a voice service unit, configured to request network registration and process a call of the voice service through the network connection after the network registration is successful.

9. The communication terminal of claim 8, wherein the POTS unit comprises:
   a terminal call transferring unit, configured to send a call transfer operation code after the network connection is set up, wherein the call transfer operation code is used to request the transfer of an incoming call of a voice service to a Public Switched Telephone Network (PSTN) number of the communication terminal or a telecommunications network number of the communication terminal.

10. The communication terminal of claim 8, wherein the POTS unit further comprises:
   a terminal call transfer canceling unit, configured to send a call transfer cancellation operation code to a server after the incoming call of the voice service is transferred.

* * * * *

UNITED STATES PATENT AND TRADEMARK OFFICE
CERTIFICATE OF CORRECTION

PATENT NO. : 8,625,511 B2
APPLICATION NO. : 13/091689
DATED : January 7, 2014
INVENTOR(S) : Xiaoling Ye It is certified that error appears in the above-identified patent and that said Letters Patent is hereby corrected as shown below:

In the Claims

In column 9, claim 6, line 19, after "call of the voice" replace "service transfer." with --service.--.

Signed and Sealed this
Sixth Day of May, 2014

Michelle K. Lee
*Deputy Director of the United States Patent and Trademark Office*